UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

INSECTICIDE AND METHOD OF MAKING SAME.

1,420,978.   Specification of Letters Patent.   Patented June 27, 1922.

No Drawing.   Application filed January 27, 1919.   Serial No. 273,440.

*To all whom it may concern:*

Be it known that I, HERBERT H. DOW, a citizen of the United States, and a resident of Midland, county of Midland, and State of Michigan, have invented a new and useful Improvement in Insecticides and Methods of Making Same, of which the following is a specification, the principle of the invention being herein explained and the best mode in which I have contemplated applying that principle, so as to distinguish it from other inventions.

The use of magnesium arsenate has only recently been proposed for insecticidal purposes. The di-magnesium orthoarsenate ($MgHAsO_4$), which is also known as the acid arsenate, has proven the most convenient to manufacture as well as an entirely satisfactory compound for use for spraying purposes or as a powder in direct application. I have found that the utility of this insecticide is measurably increased by including with such magnesium arsenate a certain proportion of magnesium hydrate. The latter constitutes a neutralizing agent in the event of any residual acidity occurring in the product and likewise takes care of any slight acidic tendency that may develop after the insecticide has been applied whether due to ionization or plant action; it also renders the mixture more slowly settling where the insecticide is applied in the form of a spray so that a uniform spraying effect is secured; and at the same time following application increases the tendency of the insecticide to adhere not only initially but following the exposure of the same to the air, the carbon dioxide in the latter presumably uniting with the hydrate to form the carbonate.

The present invention accordingly comprehends a new compound having the composition hereinafter specifically set forth and the method or process of manufacturing the same which will now be fully described and specifically stated in the following claims, it being understood, however, that changes may be made in such composition of matter and in the step or steps in question, without departing from the spirit of the invention.

As indicated, the principal and poisonous ingredient in my new insecticide consists of a magnesium salt of arsenic acid. Preferably the di-magnesium ortho-arsenate ($MgHAsO_4$) is utilized, although the tri-magnesium ortho-arsenate $Mg_3(AsO_4)_2$ will also serve. The manner in which such magnesium arsenate is prepared does not necessarily form a part of the present invention, although it may be stated that the preferred ingredients employed in the formation of these compounds are magnesium hydrate and arsenic acid, in which event the reaction occurring incidentally to the formation of the di-magnesium ortho-arsenate is as follows:—

$$Mg(OH)_2 + H_3AsO_4 = MgHAsO_4 + 2H_2O.$$

In preparing the present improved insecticidal composition I add to a given quantity of the arsenate thus prepared or derived from any other source a certain amount of magnesium hydrate, preferably about one-fifth by weight of such arsenate reduced to the dry state. The quantity of hydrate employed can be considerably smaller and still retain to a noticeable degree the advantages previously pointed out while such quantity may be increased with no other effect than to reduce of course the proportionate amount of the arsenate in the mixture. This dilution, so to speak, of the poisonous ingredient may be found desirable for certain contemplated uses of the insecticide.

After formation even the di-magnesium arsenate is relatively stable including its water of crystallization and may be admixed with such further quantity of magnesium hydrate as is found desirable, without affecting the acid hydrogen. The hydrate is preferably added to the arsenate while the latter is in the wet state in which it is precipitated, a thorough intermixture being of course desirable, and such mixture is then treated in a filter press to form a paste having any predetermined content of water, or the filter cake, with as much water extracted therefrom as possible, may thereupon be dried, and the material reduced to a powder in any suitable form of mill or pulverizing machine, preferably a pulverizing machine or disintegrator of the type in which stationary and revolving diaphragms are employed will be used. The resulting powder if it is mixed with water in the proper proportion to form a spray mixture, evidences no greater settling tendency than the original paste form, and is readily maintained in suspension with a minimum amount of agitation. When applied to growing plants or foliage the spray mixture appears to spray more evenly than either the magnesium arsenate alone or the more familiar lead arsenate, and it adheres in a much superior fashion, resisting to a marked degree the washing effect of rain.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. A composition of matter for insecticidal use comprising magnesium arsenate admixed with magnesium hydrate.

2. A composition of matter for insecticidal use comprising magnesium arsenate admixed with a relatively smaller amount of magnesium hydrate.

3. A composition of matter for insecticidal use comprising di-magnesium ortho-arsenate admixed with a relatively smaller amount of magnesium hydrate.

4. A composition of matter for insecticidal use comprising di-magnesium ortho-arsenate admixed with approximately one-fifth the amount of magnesium hydrate, all in the form of a fine dry powder.

5. The method of making an insecticide which consists in reacting between magnesium hydrate and arsenic acid, whereby magnesium arsenate is formed, the hydrate being used in excess so that a certain amount thereof will remain admixed with such arsenate.

6. The method of making an insecticide which consists in intermixing magnesium hydrate suspended in water and a solution of ortho-arsenic acid, said hydrate being in excess of the proportion required to form the di-magnesium arsenate, whereby approximately one-fifth of the amount thereof will remain admixed with such arsenate.

Signed by me, this 23rd day of January, 1919.

HERBERT H. DOW.